United States Patent
Kim et al.

(10) Patent No.: US 10,535,859 B2
(45) Date of Patent: Jan. 14, 2020

(54) POUCH-SHAPED SECONDARY BATTERY INCLUDING MICRO-PERFORATED ELECTRODE LEAD HAVING ADHESIVE PROPERTIES

(71) Applicant: LG CHEM, LTD., Seoul-si (KR)

(72) Inventors: Do Gyun Kim, Daejeon (KR); Sang Sok Jung, Daejeon (KR); Byoung Kook Lee, Daejeon (KR); Byoung Gu Lee, Daejeon (KR); Hang Soo Shin, Daejeon (KR); Geon Woo Min, Daejeon (KR); Chan Bae Kim, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 15/948,105

(22) Filed: Apr. 9, 2018

(65) Prior Publication Data
US 2018/0309112 A1 Oct. 25, 2018

(30) Foreign Application Priority Data
Apr. 24, 2017 (KR) .......................... 10-2017-0052498

(51) Int. Cl.
*H01M 2/00* (2006.01)
*H01M 2/34* (2006.01)
(Continued)

(52) U.S. Cl.
CPC .............. *H01M 2/34* (2013.01); *H01M 2/021* (2013.01); *H01M 2/0202* (2013.01);
(Continued)

(58) Field of Classification Search
CPC ... Y02T 10/7011; H01M 2/34; H01M 2/0202; H01M 2/06; H01M 2/26; H01M 2/021; H01M 2/0275; H01M 10/0525
See application file for complete search history.

(56) References Cited

U.S. PATENT DOCUMENTS 6,287,721 B1 * 9/2001 Xie ...................... H01M 2/266
429/152
9,893,344 B2 2/2018 Choi et al.
(Continued)

FOREIGN PATENT DOCUMENTS

EP 3 157 074 A1 4/2017
JP 2011-249128 A 12/2011
(Continued)

OTHER PUBLICATIONS

Office Action dated Jul. 1, 2019, from Korean Patent Office in counterpart Korean application No. 10-2017-0052498.
(Continued)

*Primary Examiner* — Cynthia H Kelly
*Assistant Examiner* — Monique M Wills
(74) *Attorney, Agent, or Firm* — Morgan, Lewis & Bockius LLP (57) ABSTRACT

Disclosed herein is a pouch-shaped secondary battery including a micro-perforated electrode lead having adhesive properties that is capable of enabling a short circuit to occur in the pouch-shaped secondary battery using the adhesive properties of the micro-perforated electrode lead with respect to a pouch-shaped battery case in order to secure the safety of the pouch-shaped secondary battery when the pouch-shaped secondary battery swells due to gas generated in the pouch-shaped secondary battery while the pouch-shaped secondary battery is in an abnormal state or when the pouch-shaped secondary battery is overcharged. Current is prevented from flowing in the pouch-shaped secondary battery when the pouch-shaped secondary battery is overcharged or when the pouch-shaped secondary battery is in an abnormal state.

19 Claims, 8 Drawing Sheets

(51) Int. Cl.
  *H01M 2/02*  (2006.01)
  *H01M 10/0525*  (2010.01)
  *H01M 2/26*  (2006.01)
  *H01M 2/06*  (2006.01)

(52) U.S. Cl.
  CPC ........... *H01M 2/0275* (2013.01); *H01M 2/06* (2013.01); *H01M 2/26* (2013.01); *H01M 10/0525* (2013.01); *Y02T 10/7011* (2013.01)

(56) References Cited

U.S. PATENT DOCUMENTS

| | | | |
|---|---|---|---|
| 2008/0305395 A1* | 12/2008 | Hirose | H01M 4/38 429/218.1 |
| 2013/0344379 A1 | 12/2013 | Yang et al. | |
| 2016/0126526 A1 | 5/2016 | Yang et al. | |
| 2017/0110712 A1 | 4/2017 | Ahn et al. | |
| 2017/0125776 A1* | 5/2017 | Lee | H01M 2/0277 |
| 2018/0062151 A1 | 3/2018 | Kim | |

FOREIGN PATENT DOCUMENTS

| | | |
|---|---|---|
| KR | 20-0452620 B1 | 3/2011 |
| KR | 10-2011-0048470 A | 5/2011 |
| KR | 10-2012-0139590 A | 12/2012 |
| KR | 10-2015-0074439 A | 7/2015 |
| KR | 10-1601123 B1 | 3/2016 |
| KR | 10-1614434 B1 | 5/2016 |
| KR | 10-2016-0129763 A | 11/2016 |
| KR | 10-2017-0044941 A | 4/2017 |

OTHER PUBLICATIONS

Office Action dated Jul. 1, 2019, from Korean Patent Office in related technology Korean application No. 10-2017-0015098.

* cited by examiner

POUCH-SHAPED SECONDARY BATTERY INCLUDING MICRO-PERFORATED ELECTRODE LEAD HAVING ADHESIVE PROPERTIES

The present application claims the benefit of Korean Patent Application No. 10-2017-0052498, filed in Korea on Apr. 24, 2017, which is hereby incorporated by reference.

BACKGROUND

Technical Field

The present invention relates to a pouch-shaped secondary battery including a micro-perforated electrode lead having adhesive properties, and more particularly to a pouch-shaped secondary battery including a micro-perforated electrode lead having adhesive properties that is capable of enabling a short circuit to occur in the pouch-shaped secondary battery using the adhesive properties of the micro-perforated electrode lead with respect to a pouch-shaped battery case in order to secure the safety of the pouch-shaped secondary battery when the pouch-shaped secondary battery swells due to gas generated in the pouch-shaped secondary battery while the pouch-shaped secondary battery is in an abnormal state or when the pouch-shaped secondary battery is overcharged.

Discussion of the Related Art

In general, there are various kinds of secondary batteries, such as a nickel cadmium battery, a nickel hydride battery, a lithium ion battery, and a lithium ion polymer battery. Such secondary batteries have been used in large-sized products that require high output, such as an electric vehicle and a hybrid electric vehicle, a power storage device for storing surplus power or new and renewable energy, and a backup power storage device, as well as small-sized products, such as a digital camera, a portable digital versatile disc (DVD) player, an MP3 player, a personal digital assistant (PDP), a portable game device, a power tool, and an electric bicycle (E-bike).

A lithium secondary battery generally includes a positive electrode, a separator, and a negative electrode. The materials of the positive electrode, the separator, and the negative electrode are selected in consideration of the lifespan, the charge and discharge capacity, the temperature characteristics, and the safety of the lithium secondary battery. In general, the lithium secondary battery is configured to have a three-layered structure, in which a positive electrode, a separator, and a negative electrode are sequentially stacked. Alternatively, the lithium secondary battery is configured to have a five-layered structure, in which a positive electrode, a separator, a negative electrode, a separator, and a positive electrode are sequentially stacked, or to have another five-layered structure, in which a negative electrode, a separator, a positive electrode, a separator, and a negative electrode are sequentially stacked.

A lithium secondary battery is charged and discharged through a process in which lithium ions from a lithium metal oxide of a positive electrode are repeatedly intercalated into a negative electrode, such as a graphite electrode, and the lithium ions are repeatedly deintercalated from the negative electrode.

Heat may be generated from such a lithium secondary battery due to a short circuit occurring in the lithium secondary battery due to external impacts, overcharge of the lithium secondary battery, or overdischarge of the lithium secondary battery. As a result, an electrolyte may be decomposed in the lithium secondary battery, and thermal runaway occurs in the lithium secondary battery. That is, the safety of the lithium secondary battery is threatened in several aspects. In particular, the secondary battery may explode for various reasons. In one example, the secondary battery may explode due to an increase in the pressure of the air in the secondary battery, which is caused by the decomposition of an electrolyte. Specifically, when the secondary battery is repeatedly charged and discharged, gas may be generated in the secondary battery as the result of the electrochemical reaction between the electrolyte and an electrode active material. The gas generated in the secondary battery increases the pressure in the secondary battery. As a result, the fastening force between parts constituting the secondary battery may be reduced, the external case of the secondary battery may be damaged, a protection circuit of the secondary battery may be operated early, an electrode of the secondary battery may be deformed, a short circuit may occur in the secondary battery, or the secondary battery may explode.

In order to secure the safety of such a battery when the battery is overcharged, overcurrent is prevented from flowing in the battery through the control of electronic parts, whereby the battery is prevented from being overcharged. To this end, a protection circuit, such as a protection circuit module (PCM), may be applied to the battery. Even in the case in which such an overcharge protection circuit, such as a PCM, is applied to the battery, however, it is difficult to sufficiently secure the safety of the battery. In particular, it is necessary for a pouch-shaped battery to be provided with a further improved protection circuit structure in order to more accurately check the swelling of the pouch-shaped battery.

In addition, there has been used a mechanical current interrupt device (CID) that physically interrupts the series connection of a battery pack using the pressure generated in the battery due to thermal expansion of the battery when the battery is overcharged in consideration of malfunction of the electronic parts of the battery. Generally, in the current interrupt device of the battery pack, there is widely used a method of physically cutting the series connection of the battery pack through the structure of the battery pack using only the pressure generated in the battery as the battery is expanded when the battery is overcharged in order to interrupt the flow of current in the battery pack. However, a current interrupt device (CID) that is capable of interrupting the flow of current in a pouch-shaped battery without using an additional component when the volume of the pouch-shaped battery is increased has not been suggested.

Korean Registered Patent No. 1601135 discloses a pouch-shaped secondary battery configured to have a structure in which two lead plates are coupled to each other via a polymer material interposed between the lead plates, in which a vent notch is provided in order to rapidly discharge gas, generated in the secondary battery, out of the secondary battery when the pressure in the secondary battery reaches a predetermined level due to the gas, and in which first and second sealants, which are interposed between the lead plates, exhibit electrical insulation and thermal fusion properties. However, a structure in which a conductive polymer is interposed between electrode leads or between an electrode lead and an electrode tab and a structure in which a notch part is formed in a film that wraps the electrode leads or the electrode lead and the electrode tab are not suggested.

Korean Patent Application Publication No. 2016-0125920 discloses a pouch-shaped secondary battery including an electrode assembly and a pouch-shaped sheathing member for receiving the electrode assembly, the pouch-shaped sheathing member including a first pouch-shaped sheathing unit and a second pouch-shaped sheathing unit, the first pouch-shaped sheathing unit and the second pouch-shaped sheathing unit being adhered to each other via a sealing unit, wherein the pouch-shaped secondary battery further includes a first electrode lead extending from the electrode assembly, the first electrode lead being attached to the first pouch-shaped sheathing unit, a second electrode lead attached to the second pouch-shaped sheathing unit, the second electrode lead being formed so as to protrude outward from the pouch-shaped sheathing member, a first sealing member interposed between the first electrode lead and the second electrode lead for preventing the first electrode lead and the second electrode lead from contacting each other, and a film-shaped connection member for electrically connecting the first electrode lead and the second electrode lead to each other. However, the invention disclosed in this publication is different from the present invention in that the sealing member is not conductive.

Korean Registered Patent No. 1192077 discloses a secondary battery including an electrode assembly, including a first electrode, a second electrode, and a separator provided between the first electrode and the second electrode, a battery case for receiving the electrode assembly, an electrode terminal electrically connected to the first electrode, and a lead tab extending from the inside of the battery case out of the battery case, the lead tab being electrically connected to the first electrode via the electrode terminal, wherein the lead tab is formed so as to be separated from at least a portion of the electrode terminal such that, when the battery case is deformed in the state in which the lead tab is in contact with the battery case, the lead tab can be electrically disconnected from the first electrode, the secondary battery further includes an adhesive member for adhering the lead tab to the electrode terminal, and the adhesive member is provided with a through-hole, through which the lead tab is electrically connected to the electrode terminal. However, the invention disclosed in this publication is different from the present invention in that an insulative polymer is interposed between electrode leads or between an electrode lead and an electrode tab.

Korean Registered Patent No. 1447064 discloses a battery cell configured such that an electrode assembly having a positive electrode/separator/negative electrode structure is mounted in a receiving unit of a battery case, wherein tabs (electrode tabs) having no active material coated thereon protrude from electrode plates constituting the electrode assembly, an electrode lead for electrically connecting the electrode tabs to each other is located at one end of a stack of the electrode tabs, and the electrode lead is inserted into the electrode tabs at the electrical connection between the electrode tabs and the electrode lead due to the deformation of the electrode lead, whereby physical coupling between the electrode tabs and the electrode lead is achieved. However, a structure in which a conductive polymer is interposed between electrode leads or between an electrode lead and an electrode tab and a structure in which a notch part is formed in a film that wraps the electrode leads or the electrode lead and the electrode tab are not suggested.

That is, a secondary battery including a micro-perforated electrode lead having adhesive properties for short-circuiting a pouch-shaped secondary battery when the pressure in the battery increases or when the volume of the battery increases in an abnormal state of the battery, for example in the case in which the battery is overcharged or in the case in which gas is generated in the battery, has not been suggested.

RELATED ART DOCUMENTS

[Patent Document 0001]
  Korean Registered Patent No. 1601135
[Patent Document 0002]
  Korean Patent Application Publication No. 2016-0125920
[Patent Document 0003]
  Korean Registered Patent No. 1192077
[Patent Document 0004]
  Korean Registered Patent No. 1447064

SUMMARY

Accordingly, embodiments of the present disclosure are directed to a pouch-shaped secondary battery including a micro-perforated electrode lead having adhesive properties that substantially obviates one or more of the problems due to limitations and disadvantages of the related art.

The present invention has been made in view of the above problems, and an object of the present invention is to provide a pouch-shaped secondary battery including a micro-perforated electrode lead having adhesive properties, and more particularly to a pouch-shaped secondary battery including a micro-perforated electrode lead having adhesive properties that is capable of enabling a short circuit to occur in the pouch-shaped secondary battery using the adhesive properties of the micro-perforated electrode lead with respect to a pouch-shaped battery case in order to secure the safety of the pouch-shaped secondary battery when the pouch-shaped secondary battery swells due to gas generated in the pouch-shaped secondary battery while the pouch-shaped secondary battery is in an abnormal state or when the pouch-shaped secondary battery is overcharged.

Another object of the present invention is to provide a pouch-shaped secondary battery including a micro-perforated electrode lead having adhesive properties that can be used instead of an additional device for interrupting the flow of current in a battery cell in an abnormal state of the battery cell, for example when the volume of the battery cell increases, thereby maintaining the energy density of the battery cell.

Additional features and aspects will be set forth in the description that follows, and in part will be apparent from the description, or may be learned by practice of the inventive concepts provided herein. Other features and aspects of the inventive concepts may be realized and attained by the structure particularly pointed out in the written description, or derivable therefrom, and the claims hereof as well as the appended drawings.

To achieve these and other aspects of the inventive concepts, as embodied and broadly described, a pouch-shaped secondary battery comprises an electrode assembly constituted by a positive electrode and a negative electrode stacked in the state in which a separator is interposed between the positive electrode and the negative electrode, an electrode tab, an electrode lead, an insulation tape, and a pouch-shaped battery case for receiving the electrode assembly, wherein one adhesion part of the electrode lead, which is configured to be adhered to the pouch-shaped battery case, and the other adhesion part of the electrode lead, which is configured to be adhered to the pouch-shaped battery case, do not partially overlap each other.

In addition, the area of the electrode lead at which the adhesion parts of the electrode lead do not overlap each other may be at least 50% of the total area of the electrode lead.

In addition, a perforated line may be formed in the electrode lead in the longitudinal direction of the electrode lead, may be formed in at least a portion of a part of the electrode lead that is perpendicular to the longitudinal direction of the electrode lead, or may be formed in at least a portion of a part of the electrode lead that is inclined with respect to the longitudinal direction of the electrode lead. Alternatively, at least one wedge-shaped perforated line may be formed in the electrode lead so as to be disposed at the vertex of the electrode lead toward the electrode tab.

In addition, the perforated line may be connected to another perforated line or may extend further in order to partition the electrode lead into two or more parts.

In addition, the perforated line may be formed so as to be parallel to the longitudinal direction of the electrode lead and/or so as to be inclined at a predetermined angle with respect to the longitudinal direction of the electrode lead.

In addition, the perforated line may be provided so as to be in contact with the outermost side of the electrode lead in the longitudinal direction of the electrode lead.

In addition, the two or more partitioned parts of the electrode lead may be alternately adhered to an upper pouch-shaped battery case unit and a lower pouch-shaped battery case unit of the pouch-shaped battery case.

In addition, the perforated line may be formed so as to have a concave and convex shape.

In addition, the concave and convex shape may have at least one selected from among a triangular section, a quadrangular section, a polygonal section, and an arbitrarily shaped section.

In another aspect of the present invention, a device including the pouch-shaped secondary battery as described above is provided.

In addition, the device may be selected from the group consisting of an electronic device, an electric vehicle, a hybrid electric vehicle, and a power storage device.

It is to be understood that both the foregoing general description and the following detailed description are exemplary and explanatory and are intended to provide further explanation of the inventive concepts as claimed.

BRIEF DESCRIPTION OF DRAWINGS

The accompanying drawings, which are included to provide a further understanding of the disclosure and are incorporated and constitute a part of this application, illustrate embodiments of the disclosure and together with the description serve to explain various principles. In the drawings.

DETAILED DESCRIPTION

Now, embodiments of the present invention will be described in detail with reference to the accompanying drawings such that the embodiments of the present invention can be easily implemented by a person having ordinary skill in the art to which the present invention pertains. In describing the principles of operation of the embodiments of the present invention in detail, however, a detailed description of known functions and configurations incorporated herein will be omitted when the same may obscure the subject matter of the present invention.

Wherever possible, the same reference numbers will be used throughout the drawings to refer to the same or like parts. Meanwhile, in the case in which one part is 'connected' to another part in the following description of the present invention, not only may the one part be 'directly connected' to the another part, but also, the one part may be 'indirectly connected' to the another part via a further part. In addition, that a certain element is 'included' means that other elements are not excluded, but may be further included unless mentioned otherwise.

Reference will now be made in detail to embodiments of the present invention, examples of which are illustrated in the accompanying drawings.

Figure 1:
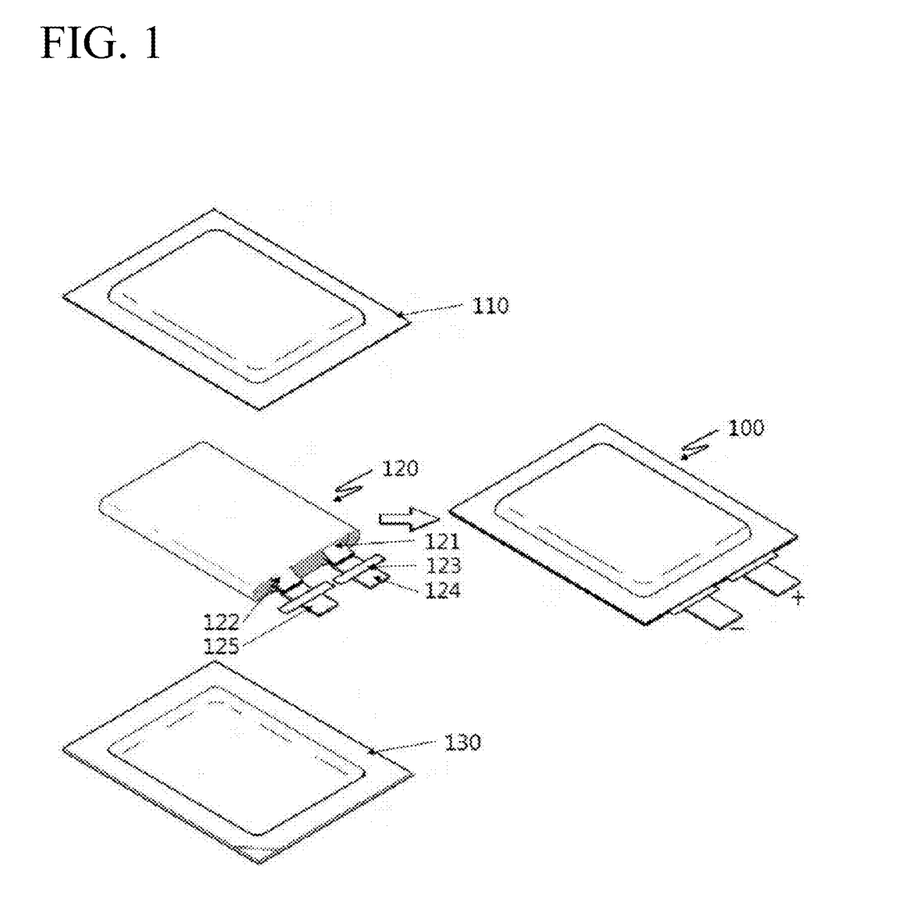
FIG. 1 is a view showing an illustrative related art pouch-shaped battery cell.

FIG. 1 is a view showing an illustrative related art pouch-shaped battery cell.

In generally, a lithium secondary battery is manufactured as follows. First, a mixture of an active material, a binder, and a plasticizer is applied to a positive electrode current collector and a negative electrode current collector in order to manufacture a positive electrode plate and a negative electrode plate, respectively. Subsequently, a plurality of positive electrode plates and a plurality of negative electrode plates are stacked in the state in which separators are interposed respectively between the positive electrode plates and the negative electrode plates in order to manufacture a battery cell having a predetermined shape. Subsequently, the battery cell is placed in a battery case, an electrolytic solution is injected into the battery case, and the battery case is sealed, whereby a secondary battery, such as a battery pack, is manufactured.

Electrode leads are connected to a general electrode assembly. Each of the electrode leads is configured to have a structure in which one end of the electrode lead is connected to the electrode assembly, the other end of the electrode lead is exposed outward from the battery case, and the battery case, in which the electrode assembly is placed, is sealed by an adhesive layer, such as a sealant layer, at the portion of the battery case from which the electrode lead extends outward from the battery case.

In addition, the electrode assembly is provided with electrode tabs. Each current collector plate of the electrode assembly includes a coated part, on which an electrode active material is coated, and an end part (hereinafter, referred to as a "non-coated part"), on which the electrode active material is not coated. Each of the electrode tabs may be formed by cutting the non-coated part, or may be a separate conductive member connected to the non-coated part by ultrasonic welding. As shown, the electrode tabs may protrude in one direction such that the electrode tabs are formed at the electrode assembly so as to be arranged side by side. Alternatively, the electrode tabs may protrude in opposite directions.

Each electrode tab serves as a path along which electrons move between the inside and the outside of the battery. Each of the electrode leads is connected to a corresponding one of the electrode tabs by spot welding. The electrode leads may extend in the same direction or in opposite direction depending on the position at which positive electrode tabs and negative electrode tabs are formed. A positive electrode lead and a negative electrode lead may be made of different materials. For example, the positive electrode lead may be made of the same material as the positive electrode plate, such as an aluminum (Al) material, and the negative electrode lead may be made of the same material as the negative electrode plate, such as a copper (Cu) material or a copper material coated with nickel (Ni). Finally, the electrode leads are electrically connected to external terminals via terminal parts thereof.

A pouch-shaped sheathing member contains the electrode assembly in a sealed state such that a portion of each of the electrode leads, e.g., the terminal part of each of the electrode leads, is exposed from the pouch-shaped sheathing member. As previously described, the adhesive layer, such as a sealant layer, is interposed between each of the electrode leads and the pouch-shaped sheathing member. The pouch-shaped sheathing member is provided at the edge thereof with a sealed region. A horizontal slit of each of the electrode leads is spaced apart from the sealed region toward a joint. That is, in the case in which each of the electrode leads is formed so as to have an inverted T shape, the leg part of the T shape protrudes outward from the pouch-shaped sheathing member whereas a portion of the head part of the T shape is located in the sealed region.

In general, a positive electrode current collector plate is made of an aluminum material, and a negative electrode current collector plate is made of a copper material. When a swelling phenomenon occurs, copper foil tends to rupture more easily than aluminum foil. For this reason, the negative electrode lead may rupture more easily than the positive electrode lead. For example, therefore, the negative electrode lead may be used as an electrode lead that is capable of rupturing.

In the normal state of the secondary battery, the electrode assembly is isolated from the outside due to the adhesive layer. When the pressure in the battery increases as the result of the overcharge of the battery or an increase in the temperature of the battery, however, the battery case may swell. At this time, the weak portion of the battery case or the adhesion portion between another component of the secondary battery and the battery case ruptures, whereby gas is discharged from the battery.

As long as the electrode leads are electrically connected to the electrode assembly, however, current continuously flows in the battery, making it very difficult to secure the safety of the battery. In order to solve this problem, the amount of electrolyte that is injected into the secondary battery may be adjusted, or the short circuit pressure of a current interrupt device (CID) may be adjusted. In this case, however, the safety of the battery is reduced when the battery is overcharged. That is, it is difficult not only to secure the safety of the battery when the battery is overcharged but also to secure the battery when the battery is used in a high-temperature situation.

COMPARATIVE EXAMPLE

Figure 2:
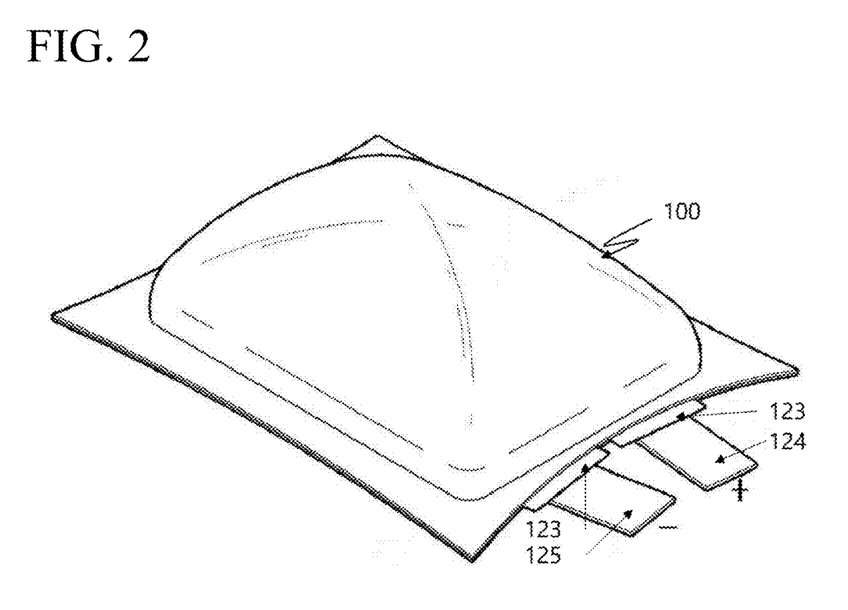
FIG. 2 is a view showing an increase in the volume of the illustrative related art pouch-shaped battery cell due to gas generated in the battery cell.

FIG. 2 is a view showing an increase in the volume of the illustrative related art pouch-shaped battery cell due to gas generated in the battery cell.

A pouch-shaped battery case includes a gas barrier layer and a sealant layer. The pouch-shaped battery case may further include a surface protective layer, which is the outermost layer formed on the gas barrier layer. The gas barrier layer is configured to prevent the introduction of gas into the battery cell. The gas barrier layer is mainly made of aluminum (Al) foil. The sealant layer is the innermost layer of the pouch-shaped battery case, which contacts the member placed in the pouch-shaped battery case, e.g., the battery cell. The surface protective layer is mainly made of nylon resin in consideration of wear resistance and heat resistance. The pouch-shaped battery case is manufactured by processing a film having the above stack structure into the shape of a pouch. Components constituting the battery cell, such as positive electrodes, negative electrodes, and separators, are placed in the pouch-shaped battery case in the state of being impregnated with an electrolytic solution. After the components constituting the battery cell are placed in the pouch-shaped battery case, the sealant layers are sealed by thermal bonding at the entrance of the pouch-shaped battery case. Since each of the sealant layers contacts the components constituting the battery cell, it is necessary for each of the sealant layers to exhibit high insulation and high resistance to the electrolytic solution. In addition, is necessary for each of the sealant layers to exhibit high sealability to such an extent that the pouch-shaped battery case can be isolated from the outside. That is, it is necessary for the sealing portion of the pouch-shaped battery case at which the sealant layers are sealed by thermal bonding to exhibit high thermal adhesive strength. In general, a sealant layer is made of a polyolefin-based resin, such as polypropylene (PP) or polyethylene (PE). In particular, each of the sealant layers of the pouch-shaped battery case is mainly made of polypropylene (PP), since polypropylene exhibits excellent mechanical properties, such as high tensile strength, high rigidity, high surface hardness, and high impact resistance, and high resistance to an electrolytic solution.

However, the related art pouch-shaped secondary battery is unsafe from the aspect of explosion danger. In general, heat and pressure are generated in a battery cell while electricity is produced/used (e.g., charged/discharged) in the battery cell (e.g., while an oxidation-reduction reaction occurs in the battery cell). At this time, high heat and pressure may be generated in the battery cell due to the overcharge of the battery cell or the short circuit in the battery cell, which may be caused by an abnormal reaction in the battery cell. The battery cell may explode due to such high heat and pressure. The related art pouch-shaped secondary battery is not provided with any mechanical means that is capable of preventing the explosion of the secondary battery. As a result, the related art pouch-shaped secondary battery is exposed to explosion danger.

<Embodiment>

Figure 3:
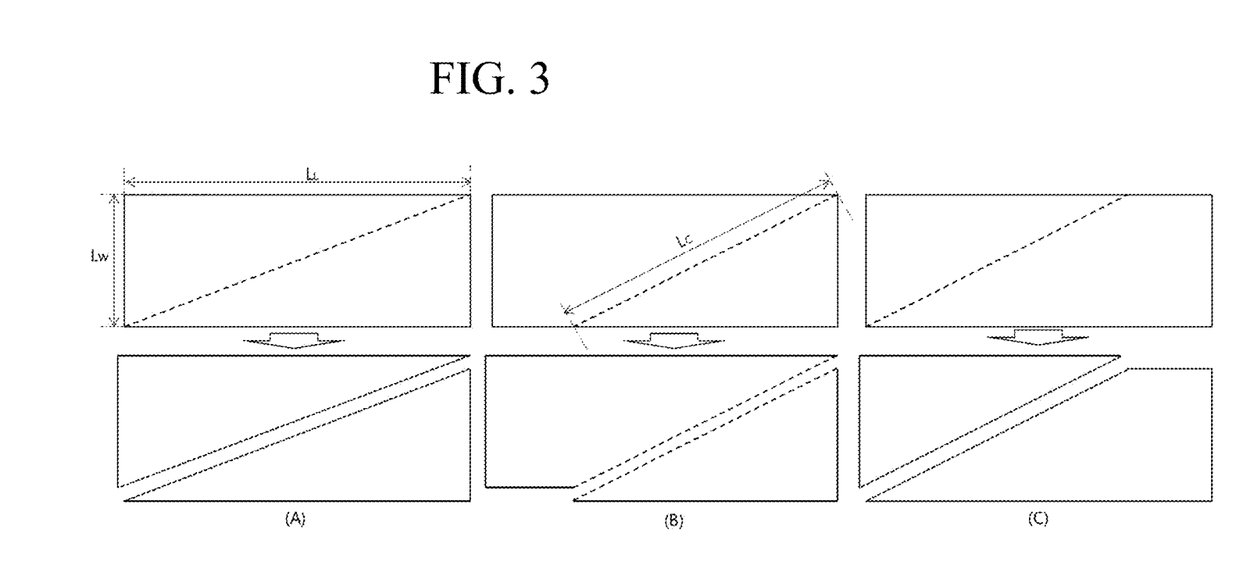
FIG. 3 is a conceptual view showing a micro-perforated electrode lead according to an embodiment of the present invention, a portion of the electrode lead configured to be adhered to a pouch-shaped battery case being partitioned into a plurality of parts, before and after the electrode lead is cut.

FIG. 3 is a conceptual view showing a micro-perforated electrode lead according to an embodiment of the present invention, a portion of the electrode lead configured to be adhered to a pouch-shaped battery case being partitioned into a plurality of parts, before and after the electrode lead is cut.

Referring to FIG. 3, the micro-perforated electrode lead may be divided into two parts in any of various forms along a perforated line. One side of electrode lead may be connected to a positive electrode tab or a negative electrode tab of the electrode assembly, and the other side of the electrode lead may protrude outward from the pouch-shaped battery case, in which the electrode assembly is mounted, as a positive electrode or a negative electrode of the pouch-shaped battery cell.

The perforated line may partition the electrode lead into two parts. FIG. 3(A) shows a perforated line formed in at least a portion of a part $L_C$ of the electrode lead that is inclined with respect to the longitudinal direction $L_L$ of the electrode lead. FIGS. 3(B) and 3(C) show a perforated line partitioning the electrode lead into two parts such that the two parts of the electrode lead have different areas.

One of the parts of the electrode lead configured to be adhered to the pouch-shaped battery case (hereinafter, referred to as "one of the adhesion parts of the electrode lead") may be adhered to an upper pouch-shaped battery case unit or a lower pouch-shaped battery case unit, in which the electrode assembly is mounted, and the other of the parts of the electrode lead configured to be adhered to the pouch-shaped battery case (hereinafter, referred to as "the other of the adhesion parts of the electrode lead") may be adhered to a pouch-shaped battery case unit that is opposite the upper pouch-shaped battery case unit, which is adhered to one of the adhesion parts of the electrode lead, or a pouch-shaped battery case unit that is opposite the lower pouch-shaped battery case unit, which is adhered to one of the adhesion parts of the electrode lead, e.g., the lower pouch-shaped battery case unit or the upper pouch-shaped battery case unit.

One of the adhesion parts of the electrode lead and the other of the adhesion parts of the electrode lead may not partially overlap each other. Specifically, one of the adhesion parts of the electrode lead and the other of the adhesion parts of the electrode lead may not overlap each other along the perforated line.

For example, the area of the electrode lead at which the adhesion parts of the electrode lead do not overlap each other may be at least 50% of the total area of the electrode lead. For example, the area of the electrode lead at which the adhesion parts of the electrode lead do not overlap each other is at least 80% of the total area of the electrode lead. In a further example, the area of the electrode lead at which the adhesion parts of the electrode lead do not overlap each other is at least 90% of the total area of the electrode lead.

The area of the electrode lead at which the adhesion parts of the electrode lead do not overlap each other may be 100% of the total area of the electrode lead.

One of the adhesion parts of the electrode lead may be strongly coupled to the upper pouch-shaped battery case unit or the lower pouch-shaped battery case unit, and the other of the adhesion parts of the electrode lead may be weakly coupled to a pouch-shaped battery case unit that is opposite the upper pouch-shaped battery case unit, which is adhered to one of the adhesion parts of the electrode lead, or a pouch-shaped battery case unit that is opposite the lower pouch-shaped battery case unit, which is adhered to one of the adhesion parts of the electrode lead, e.g., the lower pouch-shaped battery case unit or the upper pouch-shaped battery case unit.

One surface of an insulation tape is provided so as to be in contact with one of the adhesion parts of the electrode lead, and the other surface of the insulation tape is provided so as to be in contact with the pouch-shaped battery case. The insulation tape is strongly coupled to the electrode lead and to the pouch-shaped battery case. The insulation tape thermally fused to the electrode lead and to the pouch-shaped battery case.

The insulation tape may be provided so as to wrap the electrode lead.

The insulation tape may have a thickness of 10 to 50 μm, for example 15 to 30 μm. If the thickness of the insulation tape deviates from the thickness range mentioned above, the insulation tape may not exhibit normal insulation performance.

In addition, the electrode lead may have a thickness of 5 to 500 μm.

More specifically, the electrode lead may have a thickness of 10 to 500 μm, for example 15 to 300 μm. If the thickness of the electrode lead deviates from the thickness range mentioned above, the conduction performance, heat dissipation performance, and energy density of the pouch-shaped battery cell may be badly affected.

In addition, the electrode lead may be made of platinum (Pt), gold (Au), palladium (Pd), iridium (Ir), silver (Ag), ruthenium (Ru), nickel (Ni), stainless steel (STS), aluminum (Al), copper (Cu), molybdenum (Mo), chrome (Cr), carbon (C), titanium (Ti), tin (Sn), tungsten (W), tin-doped indium oxide (ITO), fluorine-doped tin oxide (FTO), or an alloy thereof. Alternatively, the electrode lead may be made of aluminum (Al), copper (Cu), or stainless steel (STS), the surface of which is treated with carbon (C), nickel (Ni), titanium (Ti), or silver (Ag).

Figure 4:
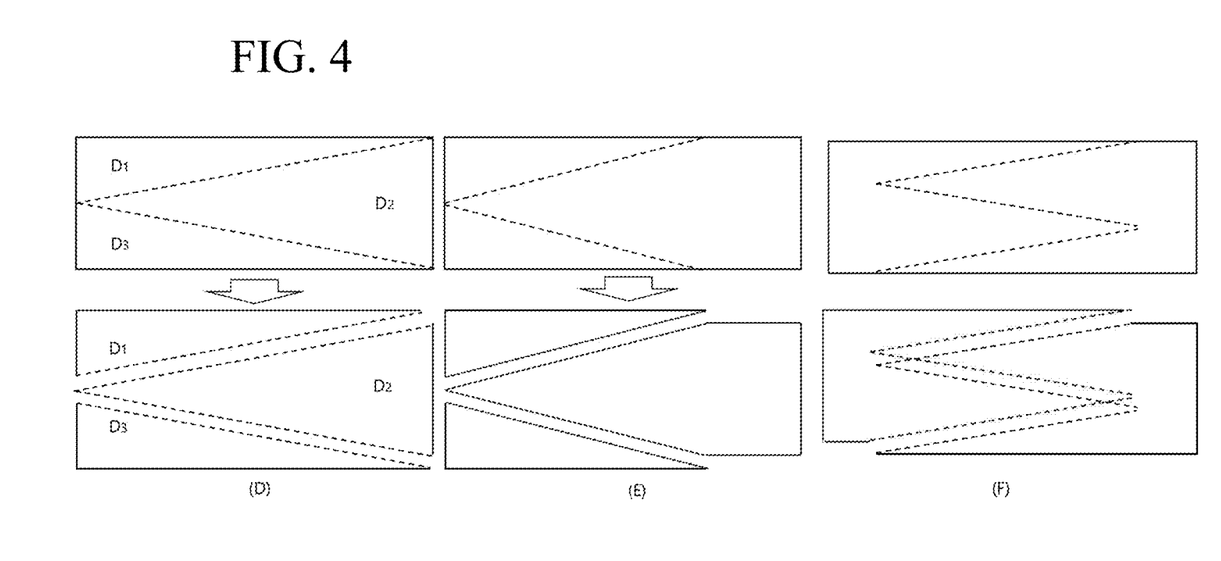
FIG. 4 is a conceptual view showing a micro-perforated electrode lead according to another embodiment of the present invention, a portion of the electrode lead configured to be adhered to the pouch-shaped battery case being partitioned into a plurality of parts, before and after the electrode lead is cut.

FIG. 4 is a conceptual view showing a micro-perforated electrode lead according to another embodiment of the present invention, a portion of the electrode lead configured to be adhered to the pouch-shaped battery case being partitioned into a plurality of parts, before and after the electrode lead is cut.

The electrode lead may be divided into two or more parts along at least one wedge-shaped perforated line. FIG. 4(D) shows a single wedge-shaped perforated line, one vertex of which is provided on a part $L_W$ of the electrode lead that is perpendicular to the longitudinal direction $L_L$ of the electrode lead so as to face an electrode tab.

The perforated line may extend to the outermost side of the electrode lead in the longitudinal direction $L_L$ of the electrode lead in a wedge form in order to partition the electrode lead into three parts. The two or more parts of the electrode lead are alternately adhered to the upper pouch-shaped battery case unit and the lower pouch-shaped battery case unit of the pouch-shaped battery case.

When gas is generated in the pouch-shaped battery case while the electrode assembly, which is mounted in the pouch-shaped battery case, is in an abnormal state, therefore, the pressure in the pouch-shaped battery case increases, whereby the pouch-shaped battery case swells. At this time, the electrode lead is separated from the pouch-shaped battery case, starting with the inside of the pouch-shaped battery case. Based on the adhesive properties of the electrode lead with respect to the pouch-shaped battery case, the electrode lead is divided from two or more parts along the perforated line, whereby the battery cell is short-circuited. An upper part $D_1$ and a lower part $D_3$ of the electrode lead are strongly adhered to one of the upper pouch-shaped battery case unit and the lower pouch-shaped battery case unit, and a middle part $D_2$ of the electrode lead is strongly adhered to the other of the upper pouch-shaped battery case unit and the lower pouch-shaped battery case unit. FIGS. 4(E) and 4(F) show the perforated line partitioning the electrode lead into two or three parts such that the partitioned parts of the electrode lead have different areas.

Figure 5:
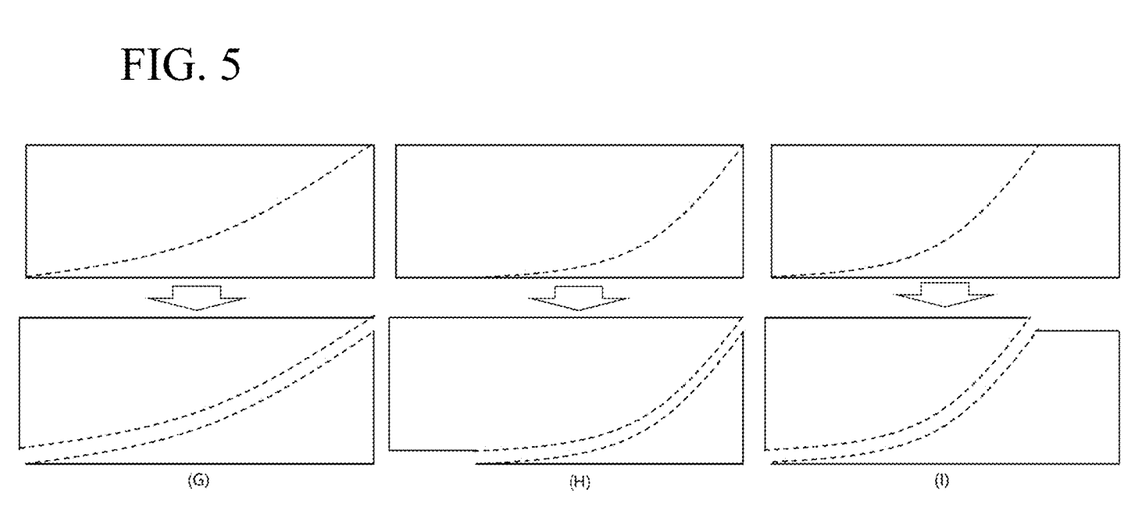
FIG. 5 is a conceptual view showing a micro-perforated electrode lead according to another embodiment of the present invention, a portion of the electrode lead configured to be adhered to the pouch-shaped battery case being partitioned into a plurality of parts, before and after the electrode lead is cut.

FIG. 5 is a conceptual view showing a micro-perforated electrode lead according to another embodiment of the present invention, a portion of the electrode lead configured to be adhered to the pouch-shaped battery case being partitioned into a plurality of parts, before and after the electrode lead is cut.

Referring to FIG. 5, the micro-perforated electrode lead may be divided into a plurality of parts along a perforated line formed in any of various shapes. One side of the electrode lead may be connected to a positive electrode tab or a negative electrode tab of the electrode assembly, and the other side of the electrode lead may protrude outward from the pouch-shaped battery case, in which the electrode assembly is mounted, as a positive electrode or a negative electrode of the pouch-shaped battery cell.

The perforated line may partition the electrode lead into two parts. FIG. 5(G) shows a round perforated line formed in at least a portion of a part $L_C$ of the electrode lead that is inclined with respect to the longitudinal direction $L_L$ of the electrode lead. FIGS. 5(H) and 3(I) show a perforated line partitioning the electrode lead into two parts such that the two parts of the electrode lead have different areas.

Figure 6:
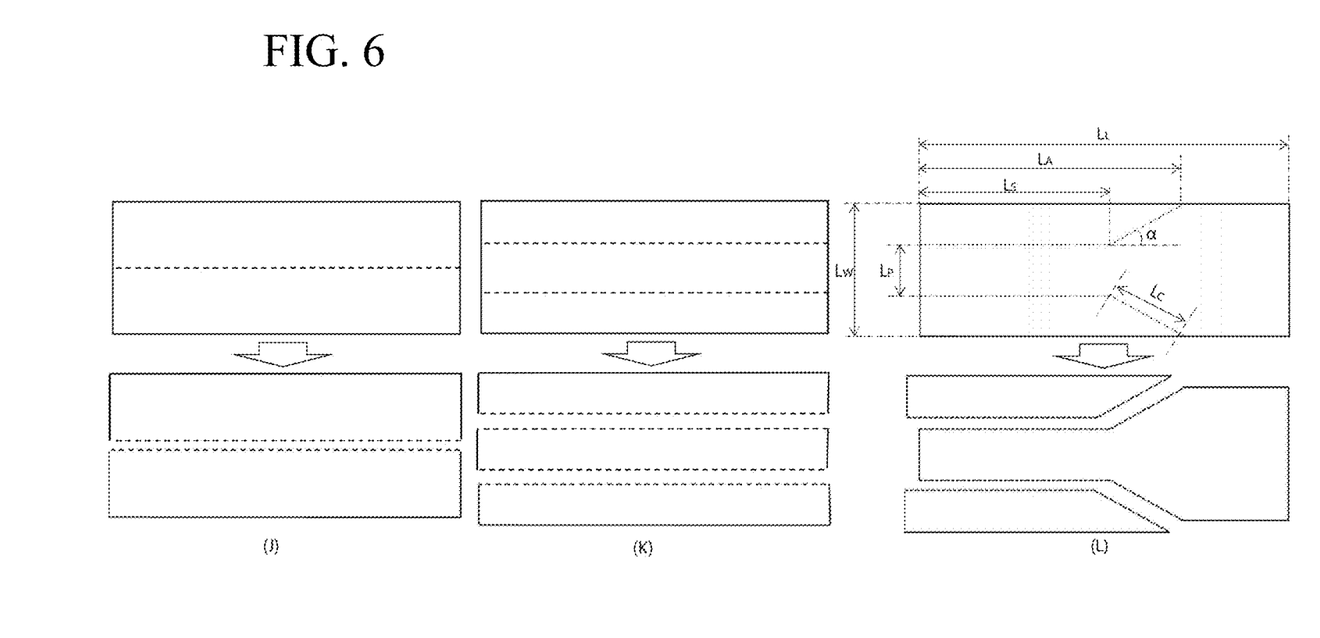
FIG. 6 is a conceptual view showing a micro-perforated electrode lead according to another embodiment of the present invention, a portion of the electrode lead configured to be adhered to the pouch-shaped battery case being partitioned into a plurality of parts, before and after the electrode lead is cut.

FIG. 6 is a conceptual view showing a micro-perforated electrode lead according to another embodiment of the present invention, a portion of the electrode lead configured to be adhered to the pouch-shaped battery case being partitioned into a plurality of parts, before and after the electrode lead is cut.

The perforated line may partition the electrode lead into two parts. FIG. 6(J) shows a single perforated line formed in at least a portion of the electrode lead so as to extend in the longitudinal direction $L_L$ of the electrode lead. FIG. 6(K) shows two perforated lines formed in at least a portion of the electrode lead so as to extend in the longitudinal direction $L_L$ of the electrode lead. FIG. 6(L) show a perforated line further formed in at least a portion of a part $L_W$ of the electrode lead that is perpendicular to the longitudinal direction $L_L$ of the electrode lead or at least a portion of a part $L_C$ of the electrode lead that is inclined with respect to the longitudinal direction $L_L$ of the electrode lead.

In addition, the perforated line may be connected to another perforated line, or may extend further in order to partition the electrode lead into two or more parts.

In addition, the perforated line may be formed so as to be parallel to the longitudinal direction of the electrode lead and/or so as to be inclined at a predetermined angle α with respect to the longitudinal direction of the electrode lead.

In addition, the perforated line may be provided so as to be in contact with the outermost side of the electrode lead in the longitudinal direction of the electrode lead.

In addition, the two or more partitioned parts of the electrode lead may be alternately adhered to the upper pouch-shaped battery case unit and the lower pouch-shaped battery case unit of the pouch-shaped battery case.

When the pouch-shaped battery cell is in an abnormal state, for example, when gas is generated in the pouch-shaped battery cell, the temperature of the pouch-shaped battery cell increases, and the pressure in the pouch-shaped battery cell increases, the pouch-shaped battery case may swell. As a result, a short circuit may occur in the pouch-shaped battery cell.

The progression of a short circuit occurring in the pouch-shaped battery cell over time will be described. When the pouch-shaped battery cell is in an abnormal state, gas is generated in the pouch-shaped battery cell, and the pressure in the pouch-shaped battery cell increases. As a result, the pouch-shaped battery case swells. At this time, one part of the electrode lead, which is strongly coupled to the pouch-shaped battery case, is deformed due to the swelling of the pouch-shaped battery case, and the other part of the electrode lead, which is weakly coupled to the pouch-shaped battery case, is separated from the one part of the electrode lead. Consequently, the connection portion of the electrode lead is physically cut.

Figure 7:
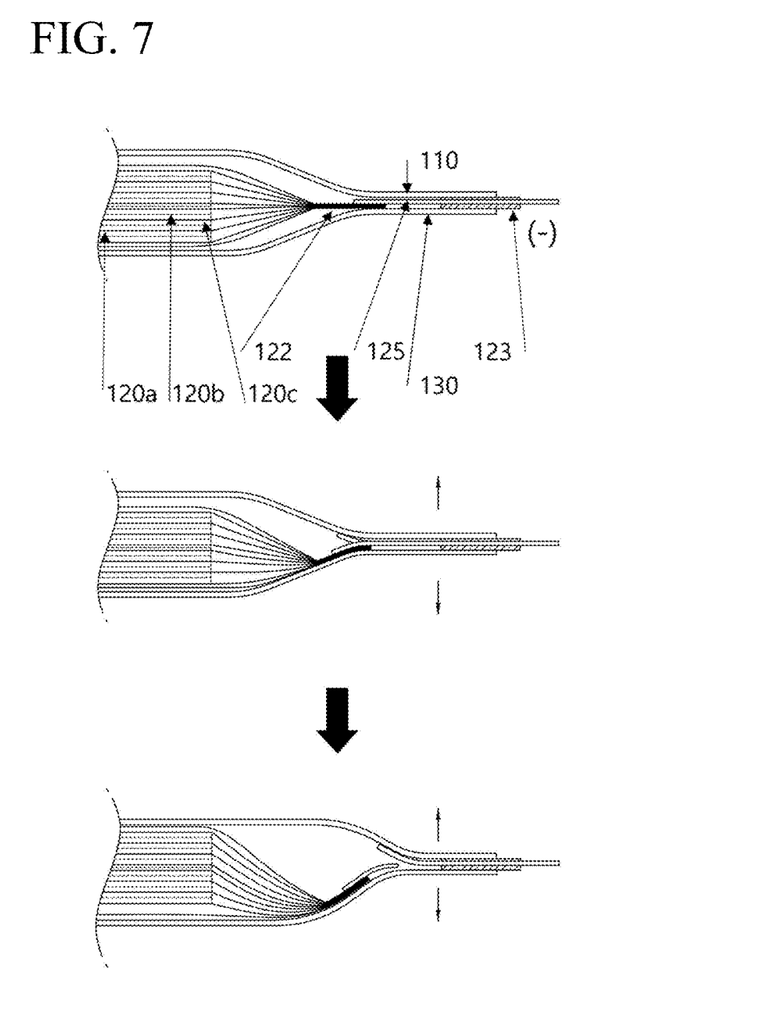
FIG. 7 is a sectional view showing a short circuit occurring in a pouch-shaped battery cell including the micro-perforated electrode lead according to the embodiment of the present invention, a portion of the electrode lead configured to be adhered to the pouch-shaped battery case being partitioned into a plurality of parts.

FIG. 7 is a sectional view showing a short circuit occurring in a pouch-shaped battery cell including the micro-perforated electrode lead according to the embodiment of the present invention, a portion of the electrode lead configured to be adhered to the pouch-shaped battery case being partitioned into a plurality of parts.

One of the two parts of the electrode lead, which are partitioned by the perforated line, is coupled to the upper pouch-shaped battery case unit, and the other of the two parts of the electrode lead is coupled to the lower pouch-shaped battery case unit. When the pouch-shaped battery cell, which has the electrode assembly received therein, is in an abnormal state, gas is generated in the pouch-shaped battery cell, and the pressure in the pouch-shaped battery cell increases. As a result, the pouch-shaped battery case swells. At this time, the electrode lead, which is selectively coupled to the pouch-shaped battery case, is deformed due to the swelling of the pouch-shaped battery case, whereby the electrode lead is divided into two parts along the perforated line. Finally, the parts of the electrode leads that are strongly coupled to the upper pouch-shaped battery case unit and the lower pouch-shaped battery case unit are separated from each other. As a result, a short circuit occurs in the pouch-shaped battery cell.

Figure 8:
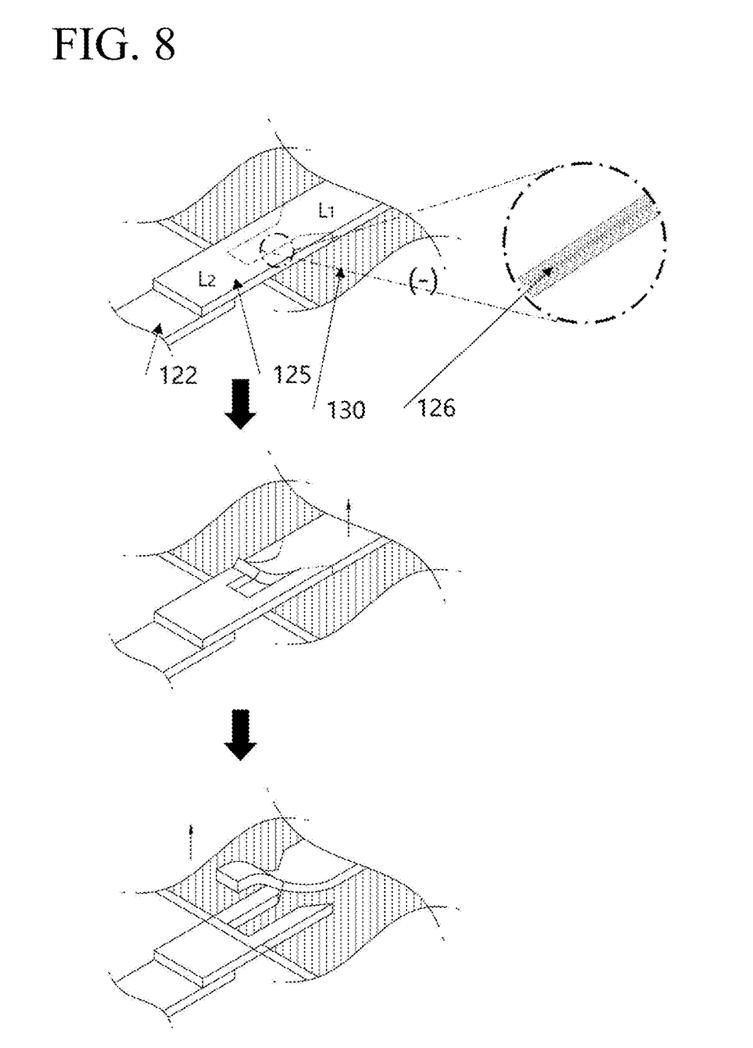
FIG. 8 is a perspective view showing a short circuit occurring in a pouch-shaped battery cell including the micro-perforated electrode lead according to the embodiment of the present invention, a portion of the electrode lead configured to be adhered to the lower pouch-shaped battery case unit being partitioned into a plurality of parts.

FIG. 8 is a perspective view showing a short circuit occurring in a pouch-shaped battery cell including the micro-perforated electrode lead according to the embodiment of the present invention, a portion of the electrode lead configured to be adhered to the lower pouch-shaped battery case unit being partitioned into a plurality of parts.

In FIG. 8, there are shown an electrode lead $L_1$ and an electrode lead $L_2$ partitioned by a perforated line, wherein the electrode lead $L_1$ is strongly coupled to the upper pouch-shaped battery case unit (not shown) and the electrode lead $L_2$ is strongly coupled to the lower pouch-shaped battery case unit. When the pouch-shaped battery cell, which has the electrode assembly received therein, is in an abnormal state, gas is generated in the pouch-shaped battery cell, and the pressure in the pouch-shaped battery cell increases. As a result, the pouch-shaped battery case swells. At this time, the electrode lead $L_1$, which is selectively coupled to the upper pouch-shaped battery case unit, is deformed due to the swelling of the pouch-shaped battery case, whereby the electrode lead $L_1$ and the electrode lead $L_2$ are separated from each other along the perforated line. Finally, the electrode lead $L_1$, which is strongly coupled to the upper pouch-shaped battery case unit, and the electrode lead $L_2$, which is strongly coupled to the lower pouch-shaped battery case unit, are separated from each other. As a result, a short circuit occurs in the pouch-shaped battery cell.

The pouch-shaped secondary battery may further include an insulation tape. The insulation tape is attached to a predetermined portion of the pouch-shaped battery case at which the electrode lead contacts the pouch-shaped battery case in order to seal the pouch-shaped battery case while insulating the electrode lead from the pouch-shaped battery case. When the pouch-shaped battery case is sealed, the pressure at the portion of the pouch-shaped battery case at which the electrode tab contacts the pouch-shaped battery case is relatively high. As a result, a casted polypropylene (CPP) layer of the pouch-shaped battery case may be easily damaged. Consequently, an inner layer of the insulation tape exhibits high mechanical strength and high heat resistance such that the shape of the insulation tape can be maintained, and thus electrical insulation between the pouch-shaped battery case and the electrode tab can be maintained when the pouch-shaped battery case is sealed by fusion in the state in which heat and pressure are applied to the pouch-shaped battery case. In particular, the inner layer of the insulation tape prevents aluminum foil of the pouch-shaped battery case from electrically contacting the electrode tab even when a portion of the aluminum foil of the pouch-shaped battery case is exposed during the sealing of the pouch-shaped battery case, whereby it is possible to maintain the insulated state of the pouch-shaped battery case. An outer layer of the insulation tape provides high adhesive force between the pouch-shaped battery case and the electrode tab even when a portion of the insulation tape is deformed in the state in which heat and pressure are applied to the pouch-shaped battery case, whereby it is possible to maintain the sealed state of the pouch-shaped battery case. Therefore, even when the casted polypropylene (CPP) layer of the pouch-shaped battery case is deformed due to heat and pressure during the sealing of the pouch-shaped battery case, whereby a portion of the aluminum foil of the pouch-shaped battery case is exposed, it is possible to maintain the insulated state of the pouch-shaped battery case.

In addition, the insulation tape may be made of at least one selected from among a thermoplastic resin, a thermosetting resin, and photo curing resin, which exhibit high electrical insulation.

A thermoplastic, thermosetting, or photo curing resin, which exhibits high electrical insulation, may be used as the polymer resin. For example, any one selected from among a styrene-butadiene resin, a styrene resin, an epoxy resin, a urethane resin, an acrylic-based resin, a phenol resin, an amide-based resin, an acrylate-based resin, and a denatured resin thereof may be used. Two or more kinds of resins may be used in a mixed state as needed. Among the polymer resins, the thermoplastic resin may be an elastomer, which serves as a matrix to support the formation of a film. The thermoplastic resin may have a softening point of about 100 to 180° C. The thermoplastic resin may account for 20 to 80 volume % of the total volume % of the polymer resin.

The thermosetting resin may include at least one selected from among an acrylic resin, an epoxy resin, an ethylene propylene diene monomer (EPDM) resin, a chlorinated polyethylene (CPE) resin, silicone, polyurethane, a urea resin, a melamine resin, a phenol resin, and an unsaturated polyester resin.

For example, the thermosetting resin may include an acrylic resin.

At least one lithium-containing metal oxide selected from the group of a lithium cobalt oxide, a lithium nickel oxide, a lithium cobalt-nickel oxide, a lithium cobalt-manganese oxide, a lithium manganese-nickel oxide, a lithium cobalt-nickel-manganese oxide, a lithium iron phosphate oxide having an olivine structure, and a lithium manganese oxide having a spinel structure, and an oxide obtained by replacing at least one of the above-specified elements with another element(s) different from the above-specified elements or doping another element(s) different from the above-specified elements may be used as the positive electrode active material. Here, the another element(s) may be at least one selected from the group consisting of Al, Mg, Mn, Ni, Co, Cr, V, and Fe.

A lithium metal, a lithium alloy (for example, an alloy of lithium and metal, such as aluminum, zinc, bismuth, cadmium, antimony, silicon, lead, tin, gallium, or indium), amorphous carbon, crystalline carbon, carbon composite, and $SnO_2$ may be used as the negative electrode active material. However, the present invention is not limited thereto.

In addition, the present invention may provide an electronic device including a pouch-shaped secondary battery.

Here, the device may be selected from the group consisting of an electronic device, an electric vehicle, a hybrid electric vehicle, and a power storage device.

In accordance with the above description, a pouch-shaped secondary battery including a micro-perforated electrode lead having adhesive properties according to the present invention may have the effect of preventing current from flowing in the pouch-shaped secondary battery when the pouch-shaped secondary battery is overcharged or when the pouch-shaped secondary battery is in an abnormal state.

In addition, the present invention may provide the effect of preventing a reduction in the energy density of the pouch-shaped secondary battery when a voluminous device is further provided in the pouch-shaped secondary battery.

In addition, the present invention may have the effect of cutting an electrode lead when the volume of the pouch-shaped secondary battery increases due to gas generated in the pouch-shaped secondary battery.

It will be apparent to those skilled in the art that various modifications and variations can be made in the pouch-shaped secondary battery including a micro-perforated electrode lead having adhesive properties of the present disclosure without departing from the technical idea or scope of the disclosure. Thus, it is intended that the present disclosure cover the modifications and variations of this disclosure provided they come within the scope of the appended claims and their equivalents.

The invention claimed is:

1. A pouch-shaped secondary battery, comprising:
a pouch-shaped battery case including an upper pouch part and a lower pouch part;
an electrode assembly in the battery case, the electrode assembly including a positive electrode, a separator, and a negative electrode stacked such that the separator is interposed between the positive electrode and the negative electrode;
an electrode tab connected to the electrode assembly;

an electrode lead including a first part connected to the electrode tab within the battery case and a second part protruding to an outside of the battery case, wherein the first part of the electrode lead is configured to be adhered to the upper pouch part of the battery case stronger than to the lower pouch part, wherein the second part of the electrode lead is configured to be adhered to the lower pouch part of the battery case stronger than to the upper pouch part, and wherein the first and second parts of the electrode lead are separated by a perforated line formed in the electrode lead.

2. The pouch-shaped secondary battery according to claim 1, wherein the electrode lead includes a first adhesion part on an upper side thereof and a second adhesion part on a lower side thereof to respectively adhere the electrode lead to the upper and lower pouch parts, and wherein an area of the electrode lead at which the first and second adhesion parts of the electrode lead do not overlap each other in a plan view of the electrode lead is at least 50% of a total area of the electrode lead.

3. The pouch-shaped secondary battery according to claim 1, wherein the perforated line is formed in the electrode lead in a longitudinal direction of the electrode lead, is formed in at least a portion of a part of the electrode lead that is perpendicular to the longitudinal direction of the electrode lead, or is formed in at least a portion of a part of the electrode lead that is inclined with respect to the longitudinal direction of the electrode lead, or wherein at least one wedge-shaped perforated line is formed in the electrode lead so as to be disposed at a vertex of the electrode lead toward the electrode tab.

4. The pouch-shaped secondary battery according to claim 3, wherein the perforated line is connected to another perforated line or extends further in order to partition the electrode lead into two or more parts.

5. The pouch-shaped secondary battery according to claim 3, wherein the perforated line is parallel to the longitudinal direction of the electrode lead or is inclined at a predetermined angle with respect to the longitudinal direction of the electrode lead.

6. The pouch-shaped secondary battery according to claim 5, wherein the perforated line is in contact with an outermost side of the electrode lead in the longitudinal direction of the electrode lead.

7. The pouch-shaped secondary battery according to claim 1, wherein the perforated line is formed in at least one point of a part of the electrode lead that is perpendicular to a longitudinal direction of the electrode lead so as to extend in the longitudinal direction of the electrode lead.

8. The pouch-shaped secondary battery according to claim 3, wherein the perforated line has one of a concave shape and a convex shape.

9. The pouch-shaped secondary battery according to claim 8, wherein the one of the concave shape and the convex shape has a shape selected from among a triangular section, a quadrangular section, a polygonal section, and an arbitrarily shaped section.

10. A device comprising a pouch-shaped secondary battery according to claim 1.

11. The device according to claim 10, wherein the device is selected from a group consisting of an electronic device, an electric vehicle, a hybrid electric vehicle, and a power storage device.

12. The device according to claim 10, wherein the electrode lead includes a first adhesion part on an upper side thereof and a second adhesion part on a lower side thereof to respectively adhere the electrode lead to the upper and lower pouch parts, and wherein an area of the electrode lead at which the first and second adhesion parts of the electrode lead do not overlap each other in a plan view of the electrode lead is at least 50% of a total area of the electrode lead.

13. The device according to claim 10, wherein the perforated line is formed in the electrode lead in a longitudinal direction of the electrode lead, is formed in at least a portion of a part of the electrode lead that is perpendicular to the longitudinal direction of the electrode lead, or is formed in at least a portion of a part of the electrode lead that is inclined with respect to the longitudinal direction of the electrode lead, or wherein at least one wedge-shaped perforated line is formed in the electrode lead so as to be disposed at a vertex of the electrode lead toward the electrode tab.

14. The device according to claim 13, wherein the perforated line is connected to another perforated line or extends further in order to partition the electrode lead into two or more parts.

15. The device according to claim 13, wherein the perforated line is parallel to the longitudinal direction of the electrode lead or is inclined at a predetermined angle with respect to the longitudinal direction of the electrode lead.

16. The device according to claim 15, wherein the perforated line is in contact with an outermost side of the electrode lead in the longitudinal direction of the electrode lead.

17. The device according to claim 10, wherein the perforated line is formed in at least one point of a part of the electrode lead that is perpendicular to a longitudinal direction of the electrode lead so as to extend in the longitudinal direction of the electrode lead.

18. The device according to claim 13, wherein the perforated line has one of a concave shape and a convex shape, and wherein the one of the concave shape and the convex shape has a shape selected from among a triangular section, a quadrangular section, a polygonal section, and an arbitrarily shaped section.

19. The pouch-shaped secondary battery according to claim 8, further comprising an insulation tape between the electrode lead and the battery case to insulate the electrode lead from the battery case.

* * * * *